Sept. 28, 1937.   J. A. DRAIN, JR   2,094,234
FLAW DETECTOR FOR ELECTRICAL CONDUCTORS
Filed June 4, 1936

INVENTOR
JAMES A. DRAIN, JR.
BY
Joseph H. Lipschutz
ATTORNEY

Patented Sept. 28, 1937

2,094,234

UNITED STATES PATENT OFFICE 2,094,234

FLAW DETECTOR FOR ELECTRICAL CONDUCTORS

James A. Drain, Jr., Brooklyn, N. Y., assignor to Sperry Products, Inc., Brooklyn, N. Y., a corporation of New York Application June 4, 1936, Serial No. 83,413

6 Claims. (Cl. 175—183)

This invention relates to testing electrical conductors for flaws. It is designed for rapid testing of a predetermined length of said conductor and is particularly adapted for testing welded sections of conductor, such as welded rail joints either in track or out of track. My invention contemplates passing current through the section of conductor to be tested, placing a plurality of potential contacts in engagement with said section, and measuring the potential drop between predetermined contacts. In utilizing a plurality of potential contacts it will be understood that if the drop in potential is taken between adjacent contacts, and a fissure happens to be positioned under one of said contacts, then it will not be possible to detect the presence of the fissure since the potential drop between adjacent contacts will be unaffected because of the location of the fissure under one of the contacts rather than between the same. To obviate this condition I provide for measuring the potential drop between contacts which are not adjacent, such as between alternate contacts, so that if a fissure is located under one contact it will be detected when the potential drop between the contacts on either side thereof is measured.

It is a further object of my invention to provide means for facilitating the measurement and quick reading of the potential drop between a plurality of potential contacts in engagement with the conductor under test.

It is a further object of my invention to provide a mechanism as described above which may be operated by an operator within a car travelling along the rails of the track when the track is to be tested, without the necessity of the operator leaving the car.

It is a further object of my invention to provide a support which will extend over a predetermined portion of the conductor to be tested so that by means of my arrangement a predetermined length of conductor may be tested without moving contacts or other mechanism relative to the conductor. Testing by means of moving contacts over a conductor has previously been proposed but this gives rise to difficulties due to variations in resistance caused by unequal contact pressure and foreign matter on the conductor. By utilizing a fixed set of contacts in engagement with a predetermined length of conductor, all these disadvantages may be avoided.

Further objects and advantages of this invention will become apparent in the following detailed description thereof.

In the accompanying drawing.

It is known in the art that electric conductors may be tested for internal fissures by passing current through the conductor and then measuring the variations in the characteristics of current flow caused by the presence of an internal fissure. Such measurement may consist in measuring variations in potential drop from point to point or it may consist in measuring the distortion in the electromagnetic field caused by the deflection of the current within the conductor due to a fissure. In the latter case, induction coils may be employed. The present invention contemplates employing potential contacts for measuring the potential drop caused by the presence of a fissure within a conductor. While the device is applicable to the testing of electrical conductors generally, I have chosen to illustrate the invention as applied to a device for testing rails in track and particularly for the purpose of testing welded joints.

Figure 1:
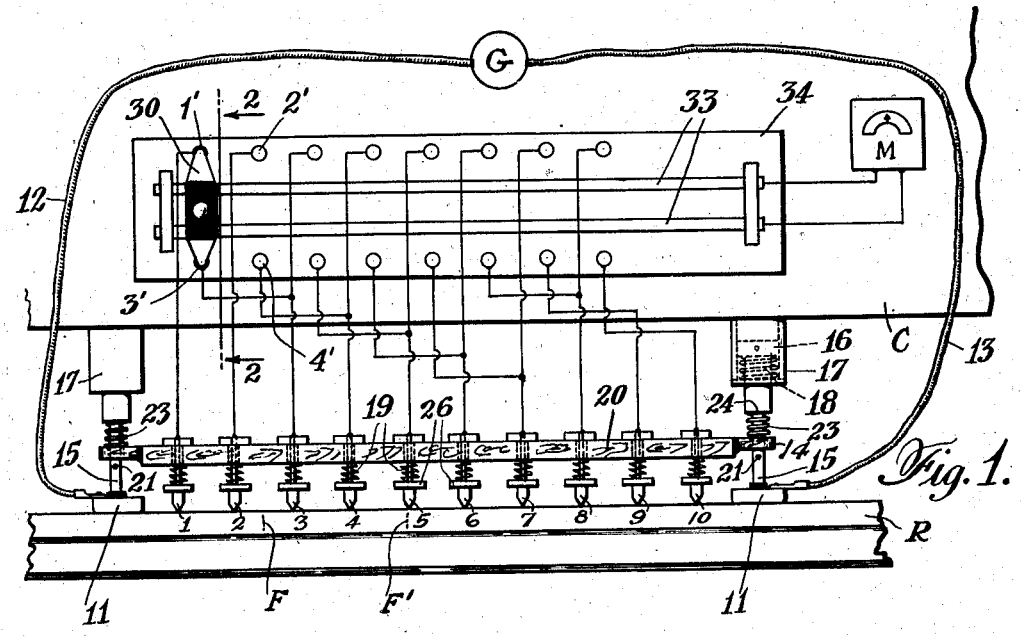
Fig. 1 is a view partly diagrammatic and with parts broken away showing my invention applied to a device for testing rails in track.
Figure 2:
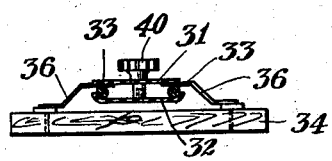
Fig. 2 is a section taken substantially along the line 2—2 of Fig. 1.
Figure 3:
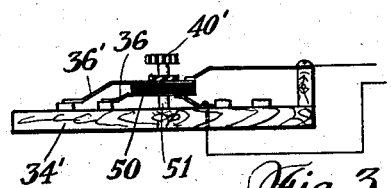
Fig. 3 is an end elevation of a modified form of selector switch mechanism.

Referring to Fig. 1, my invention is shown applied to a car, only a portion of which is indicated generally at C, adapted to ride on the rails of a track by means of wheels, not shown, and supporting therein means such as a generator G for sending current through the rail to be tested. The current is sent through the rail R by means of current brushes in the form of pads 11 adapted to be brought into engagement with the rail, the conductors 12 and 13 serving to connect said pads to the generator G. Thus, when the pads are placed in engagement with the rail R a circuit is established from generator G through the rail R by way of pads 11 and conductors 12, 13. The pads 11 are carried at the lower ends of piston rods 15 connected to pistons 16 operating within cylinders 17. The pistons 16 are normally held in elevated position by means such as springs 18 but when it is desired to lower the pads into engagement with the rail, fluid under pressure, such as compressed air, is introduced into cylinders 17 to cause the pistons to be depressed and to move the pads 11 into engagement with rail R.

At the same time that the pads 11 engage the rail to establish the electric circuit through the rail, there is adapted to be moved into engagement with the rail a support 20 for a plurality of contacts, numbered in this instance 1 to 10. For this purpose the said support 20 may be slidably mounted by means of perforated lugs 14 at each end upon the piston rods 15 and supported by stops 21 on said rods when the pads are in elevated position. When the piston rods are depressed, the support 20 will move therewith until the contacts 1 to 10 engage the rail, and thereafter further movement of the rods will cause the said support to be pressed more firmly into engagement with the rail by means of springs 23 positioned between the ends of support 20 and a shoulder 24 on the piston rods. It will be understood that the stops 21 are so positioned relative to the tips of the contacts 1 to 10 that the said contacts will engage the rail before the pads 11, so as to permit spring pressure to be applied to the support 20 to hold the said contacts firmly in engagement with the rail. The contacts are also resiliently mounted in support 20 by means of springs 19 interposed between support 20 and a shoulder 26 on each contact member.

By measuring the potential drop between contacts, internal defects within the electric conductor may be detected. Thus, if a fissure F is located between contacts 2 and 3 it will be detected by reason of the fact that the potential drop between 1 and 2 is different from the potential drop between 2 and 3. However, if a fissure such as F' is located, for example, directly beneath contact 5, it could not be detected because the potential drop between contacts 4 and 5 is the same as the potential drop between contacts 5 and 6. For this reason I provide the following novel method of measuring potential drop for the purpose of detecting fissures, which method will obviate the difficulty just mentioned. This method consists in measuring the potential drop, not between adjacent contacts such as between 1 and 2, 2 and 3, etc., but between contacts such as, for example, 1 and 3, 2 and 4, etc. It will now be seen that if a fissure is positioned directly beneath contact 5, for instance, and the potential drop between contacts 3 and 5 is measured, such potential drop is the same as between 2 and 4 but the potential drop between 4 and 6 will reveal the presence of a fissure directly beneath contact 5. While I have disclosed this method as consisting in measuring the potential drop between alternate contacts, it will be understood that it is applicable also to measuring the potential drop between any pairs of contacts other than adjacent contacts.

In order to cover a substantial section of electrical conductor to be tested, the support 20 would have to be of considerable length and the number of contacts correspondingly great. While for purposes of illustration I have shown ten contacts, it will be understood that a much larger number may be employed, depending upon the fineness of the testing interval and the length of conductor to be tested at one application of the support 20. To facilitate the reading of the potential drop between the multiplicity of contacts, I have disclosed several novel switching arrangements, one of which is shown in Fig. 1 and consists of a movable contactor 30 consisting of upper and lower members 31 and 32 adapted to engage on opposite sides of guide bars 33 fixed in spaced relation to a base 34. The said base 34 carries a plurality of sets of contacts which are connected to the respective pairs of contacts between which the potential drop is to be measured. The contacts on the base 34 carry the same numbers as the potential contacts to which they are connected, with a prime added. The contactor 30 is provided with spring fingers 36 adapted to engage the contacts on the base 34. Thus, as the contactor 30 is grasped by the knob 40 and moved along guide rods 33, the spring fingers 36 will first engage the pair of contacts 1', 3' to measure the potential drop between contacts 1 and 3 and will then engage the contacts 2', 4' to measure the potential drop between contacts 2 and 4, etc. The spring fingers 36 will tap the potential difference between the respective pairs of contacts and transmit said potential to the rods 33 which are electrical conductors, said rods being connected to a suitable meter such as galvanometer M so that the respective values may be read.

Figure 4:
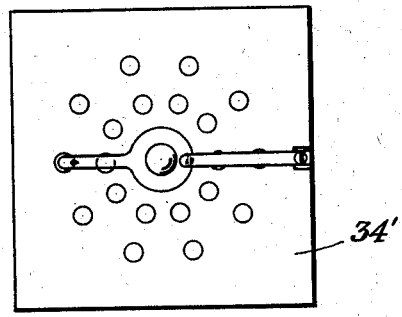
Fig. 4 is a plan view of the Fig. 3 device.

In a modified form of switching arrangement I provide a rotatable member 50 fixed to a shaft 51 mounted for rotation in base 34' and rotatable by means of knob 40' fixed to the upper end of shaft 51. Said member 50 has fixed thereto spring contact fingers 36' engaging two rows of contacts, an inner row and an outer row, as shown in Fig. 4. The said fingers are positioned so that they will engage a pair of contacts at the same time and the said contacts are connected to the potential contacts 1 to 10 inclusive in the same manner as the contacts on base 34.

It will be seen that the above arrangement is particularly adapted for testing rails in track since the car C moves along the rails and is stopped in the position where support 20 overlies the portion of the rail to be tested. This portion may be a welded joint portion where it is desired to test the efficiency of the weld. When in such position the operator merely applies fluid pressure to the cylinder 17 and the pads 11 are lowered into engagement with the rail to pass current therethrough and support 20 is pressed into firm contact with the rail. The operator then operates the switch contactor 30 or 50 to get a rapid reading of the potential drop between the selected pairs of potential contacts.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The method of detecting flaws in electrical conductors which consists in passing current through the portion of the conductor to be tested, applying a plurality of contacts to said portion, and measuring the potential drop through the conductor between pairs of contacts other than adjacent contacts.

2. The method of detecting flaws in electrical conductors which consists in passing current through the portion of the conductor to be tested, applying a plurality of contacts to said portion, and measuring the potential drop through the conductor between alternate contacts.

3. In a device for detecting flaws in electrical conductors, means for passing current through a predetermined portion of a conductor, a plurality of potential contacts, means for supporting said contacts in engagement with the conductor, and means for measuring the potential drop between pairs of contacts other than adjacent contacts.

4. In a device for detecting flaws in electrical conductors, means for passing current through a predetermined portion of a conductor, a plurality of potential contacts, means for supporting said contacts in engagement with the conductor, and means for measuring the potential drop between alternate contacts.

5. In a device for detecting flaws in electrical conductors, means for passing current through a predetermined portion of a conductor, a plurality of potential contacts, means for supporting said contacts in engagement with the conductor, and means for measuring the potential drop between potential contacts, said last-named means comprising switch mechanism having a plurality of contacts connected to respective potential contacts, and a movable contactor member adapted to connect pairs of switch contacts, each pair of switch contacts being connected to a pair of potential contacts other than adjacent potential contacts.

6. In a device for detecting flaws in electrical conductors, means for passing current through a predetermined portion of a conductor, a plurality of potential contacts, means for supporting said contacts in engagement with the conductor, and means for measuring the potential drop between potential contacts, said last-named means comprising switch mechanism having a plurality of contacts connected to respective potential contacts, and a movable contactor member adapted to connect pairs of switch contacts, each pair of switch contacts being connected to a pair of alternate potential contacts.

JAMES A. DRAIN, Jr.